(12) United States Patent
Chakra et al.

(10) Patent No.: US 8,146,104 B2
(45) Date of Patent: Mar. 27, 2012

(54) SYSTEM AND METHOD FOR PROGRAMMATICALLY GENERATING TO-DO LIST AND CREATING NOTIFICATION BETWEEN CALENDAR AND OTHER APPLICATIONS

(75) Inventors: Al Chakra, Apex, NC (US); Yuping Connie Wu, Cary, NC (US); Yongcheng Li, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1204 days.

(21) Appl. No.: 11/869,278

(22) Filed: Oct. 9, 2007

(65) Prior Publication Data
US 2009/0094623 A1 Apr. 9, 2009

(51) Int. Cl.
*G06F 11/00* (2006.01)
*G06F 9/46* (2006.01)
(52) U.S. Cl. ............ 719/318; 714/48; 718/101; 719/328
(58) Field of Classification Search .................... 714/48; 718/101; 719/318, 328
See application file for complete search history.

(56) References Cited

U.S. PATENT DOCUMENTS

| 6,680,675 | B1 | 1/2004 | Suzuki | |
|---|---|---|---|---|
| 6,957,363 | B2* | 10/2005 | Spiegel | 714/24 |
| 7,523,397 | B2* | 4/2009 | Cheung et al. | 715/710 |
| 7,712,049 | B2* | 5/2010 | Williams et al. | 715/834 |
| 7,788,589 | B2* | 8/2010 | Frankel et al. | 715/752 |
| 7,920,857 | B2* | 4/2011 | Lau et al. | 455/419 |
| 2006/0074727 | A1* | 4/2006 | Briere | 705/8 |
| 2006/0167737 | A1* | 7/2006 | Muller et al. | 705/9 |
| 2007/0124371 | A1* | 5/2007 | Desai et al. | 709/204 |
| 2007/0282951 | A1* | 12/2007 | Selimis et al. | 709/205 |

FOREIGN PATENT DOCUMENTS
EP 14141300 A1 7/2004
* cited by examiner

*Primary Examiner* — Charles E Anya
(74) *Attorney, Agent, or Firm* — Convergent Law Group LLP

(57) ABSTRACT

A method, apparatus, and program product are provided for integrating a calendar todo list with information from other applications. The method comprises the steps of: dynamically extracting data for open application processes, and creating task listings using the data for the open application processes. The apparatus comprises a processor adapted to dynamically extract data for open processes and create task listings using the data for the open application processes, and a memory having stored thereon a calendar application with a list of tasks. The program product comprises a machine readable media having encoded thereon, machine executable instructions for dynamically extracting data for open application processes, and creating task listings using the data for the open application processes.

14 Claims, 6 Drawing Sheets

| SUBJECT | DUE DATE | STATUS | GENERATION TYPE | APPLICATION TYPE | LIST OF PERSON TO BE SATISFIED | CATEGORY |
|---|---|---|---|---|---|---|
| PROJECT OVERVIEW PRESENTATION 611 | 9/14/2007 3:00PM 612 | IN PROGRESS 613 | DYNAMIC 614 | MS PPT 615 | | PROJECT 617 |
| CUSTOMER ISSUE EMAIL TO CEO 621 | 9/14/2007 1:30PM 622 | IN PROGRESS 623 | DYNAMIC 624 | LOTUS NOTES 625 | CHAKRA AL 626 | CUSTOMER 627 |
| MY WORK OVER WEEKEND 631 | 8/19/2007 1:30PM 632 | IN PROGRESS 633 | MANUAL 634 | | | HOME PROJECT 637 |

FIG. 6

SYSTEM AND METHOD FOR PROGRAMMATICALLY GENERATING TO-DO LIST AND CREATING NOTIFICATION BETWEEN CALENDAR AND OTHER APPLICATIONS

FIELD OF THE INVENTION

The invention relates to the field of integrating computer applications and more particularly to an apparatus, method and program product for interfacing between calendar todo lists and other applications.

BACKGROUND

Computing equipment and particularly Personal Computers (PC's) are being provided with increasing multitasking capabilities, whereby multiple applications can be opened at the same time, and applications in the background can continue to run as processor time is available. Applications have taken advantage of this multitasking capability by introducing multitasking models. Whether by spawning new processes or new independent JVMs, applications are utilizing the tabs method to create user friendly multitasking while having the user stay within one application. Whether the application is Internet Explorer or Firefox Browser, Lotus Notes, or MS Word, or an email application users can navigate through a number of instances within each application and a number of different applications, all of which may be open at the same time on a single computer. This allows for manifold undertakings as the user conducts business throughout the day.

Because of the power and flexibility of the tab method, many workers today utilize their computer desktop as an informal reminder of tasks that they need to perform. For example, a user is asked to prepare a summary of a new software patch. He or she opens a document in MS Word and types in a title "??? Software Patch". The user then brings up a PowerPoint presentation that he/she is working on for a presentation that afternoon. The open MS Word document is moved to the background and a tab is provided on the task bar of the user's desktop, showing the title of the document. Thus, the user can use the tabs as a reminder of tasks to be completed, but which the user may not currently be actively working on.

A problem arises when the computer shuts down or freezes, or when the worker becomes distracted with another application in the foreground, and fails to check on the document that needs to be worked on. Some operating systems offer to close all tabs at once and not just one active process within an application. Some applications, such as MS Office applications, offer to save the work for individual tabs when abruptly closing, while others, such as Lotus Notes, do not. Thus, a user who is using tabs as a reminder of pending tasks may close the tab inadvertently, with or without saving changes. While some application may save the partially completed process, the user will not be notified of the process until the relevant application is opened again.

It is an object of the present invention to provide task listings for open application processes and reminders for such processes to a user.

SUMMARY

In an exemplary embodiment, the invention provides a method for integrating a calendar todo list with information from other applications. The method comprises the steps of: dynamically extracting data for open application processes, and creating task listings using the extracted data for the open application processes. These task listings may optionally be pushed to a calendar todo list. Moreover, reminders may be provided to a user of impending task due dates and times, using either or both of an existing calendar reminder function and a separate reminder function using status data extracted from open application processes.

Other aspects of the invention may be realized in the form of an apparatus and a program product for integrating a calendar todo list with information from other applications. In an exemplary embodiment, the apparatus comprises a processor adapted to dynamically extract data for open application processes, and a memory having stored thereon a calendar application with a list of tasks. The program product comprises a machine-readable media having encoded thereon machine executable instructions for dynamically extracting data for open application processes, and creating task listings using the data for open application processes.

BRIEF DESCRIPTION OF THE DRAWINGS

The features and advantages of the invention will be more clearly understood from the following detailed description of the preferred embodiments when read in connection with the accompanying drawing. Included in the drawing are the following figures:

FIG. 6 is a screen shot of a user interface showing a todo list having dynamically created task listings according to an exemplary embodiment of the invention.

DETAILED DESCRIPTION

The present invention provides a method, apparatus and program product for interfacing a calendar application with other applications to create an manage dynamic task listings. Dynamic task listings are listings, such as for a todo list, created using data extracted from in-process application processes. The processes may comprise, for example, documents being created in a word processing application, emails being created in a email application, presentations being created in a presentation application, spreadsheets being created in a spreadsheet application, and the like.

Figure 1:
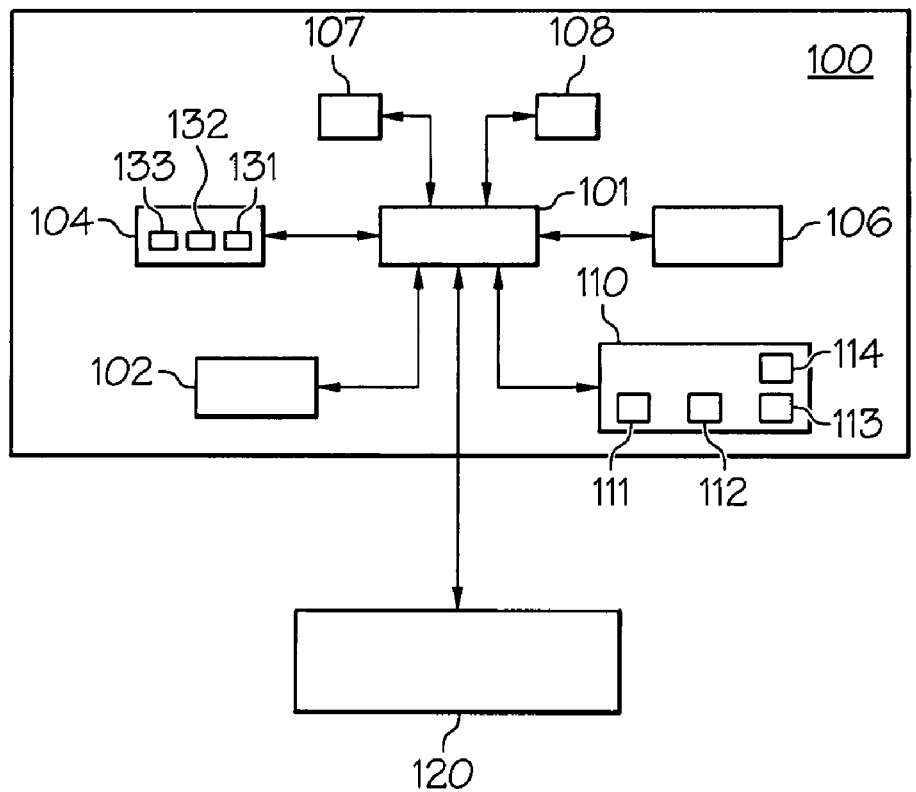
FIG. 1 is a block diagram of an apparatus for interfacing a calendar application with other applications according to an exemplary embodiment of the invention.
Figure 7:
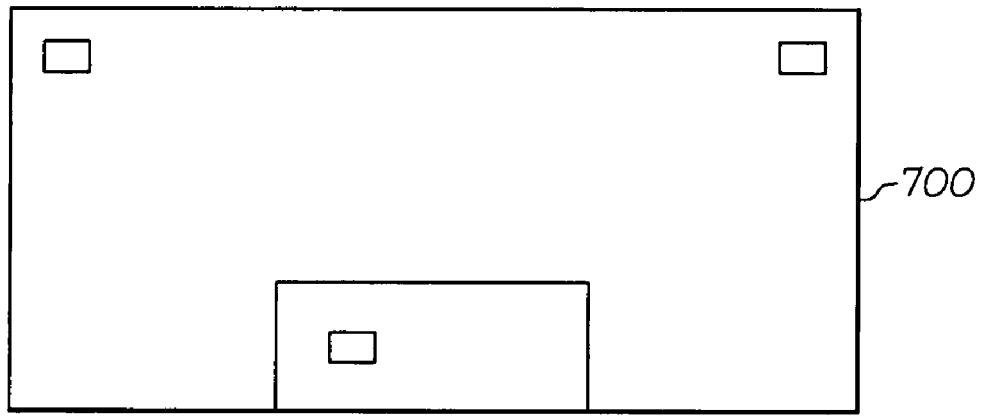
FIG. 7 is a plan view of a program product according to an exemplary embodiment of the invention.

Referring to FIG. 1, an apparatus 100 is shown for interfacing a calendar application with other applications to create and manage dynamic task listings. The illustrated exemplary apparatus comprises a data bus 101 connected to and interconnecting a processor 102, a Random Access Memory (RAM) 104, a display 106, user interface devices such as a keyboard 107 and a mouse 108, and one or more memory devices 110 such as hard drives and various media drives. The apparatus 100 may optionally be connected to a network 120 such as the internet or an intranet. This connection may be through the data bus 101 as shown, and may be through a network card or the like (not shown).

In an exemplary embodiment, the processor 102 executes applications 111, 112, 113, 114 encoded on memory 110. The applications may comprise, for example, a calendar application 111, a word processing application 112, a browser application 113 and an interface application 114. The calendar application 111 and the interface application 114 may be opened and begin executing as part of a normal start-up routine. The interface application may optionally be integral with the calendar application.

A user may open the word processing application 112 and begin a first word processing process 131, such as a document in MS Word or Lotus Notes. The user may also begin a second process 132 in the word processing application 112. The word processing processes 131, 132 which are in-progress are stored in RAM 104, which will not be saved if the apparatus 100 is shut down or freezes. Some word processing applications will also save the processes in-progress within the word processing application 112 and remind the user of the processes when the word processing application 112 is next opened. Other applications do not save processes that are in-progress.

While the first and second word processing processes 131, 132 are in-progress, the user may open another application such as browser application 113 and begin a browser process 133, in an exemplary case opening a web page. At this point the browser application 133 is in the foreground of the user's desktop or graphical user interface (GUI) visible on display 106, and the work processing processes 131, 132 are in the background with tabs visible on the user's desktop.

The interface application 114 opens during a start-up process of the machine 100. When a process 131, 132, 133 is started in an application, the interface application 114 identifies the process in one of a variety of ways. For example, the interface application 114 may periodically query an application within the operating system such as Windows Task Manager or the like. Alternatively, the interface application may be interconnected with an application such as the Task Manager such that the interface application 114 automatically executes a routine to extract data from a process 131, 132, 133 as it is initiated. This interconnection may be, for example, a hooking routine or other means.

The interface application 114 extracts data from the in-progress processes 131, 132, 133 and creates dynamic task listings 610, 620 (shown in FIG. 6) for the in-progress processes 131, 132, 133. The task listings may be stored in the interface application 114 or pushed to the calendar application 111 and added to a todo list. The data collected may include, for example, the application in which the process was initiate, a person to be satisfied by the process, addressee(s) of an email or other message, a due date/time for the process, a subject or title, a status (e.g., when last modified, whether or not completed), and other attributes that may be determined to be useful.

In an exemplary embodiment, the calendar application 111 provides reminders to the user when certain conditions are met. For example, the calendar may provide a reminder when the due date/time for a task is reached. The calendar may also provide a reminder at a time that is a specified period before the due date/time is reached to allow the user to prepare for the task due date/time. A reminder may also be provided to the user from the interface application 114 if an application process has not been worked on for a specified period of time (i.e., if a specified idle time is reached).

The specified time idle time may be provided by the interface application 114, the calendar application 111, or the other applications 112, 113, etc. In an exemplary embodiment, the allowed idle time may be provided in a table as shown below in table 1, wherein the allowable idle time is a function of the level in the enterprise organization of the person to whom the process is directed. Such configuration may be customizable by the user.

TABLE 1

| "to" field of email list | Time to reminder |
| --- | --- |
| Current LDAP Hierarchy level +2 | 3 minutes |
| Current LDAP Hierarchy level +1 | 10 minutes |
| Coworkers | 20 minutes |
| Friends (outside the organization) | 40 minutes |
| Others | 1 hours |

In the example of table 1, the allowable idle times are provided for emails based on the level of the person identified in the addressee or "to" field. Thus, if the addressee is 2 or more levels higher in the enterprise's organizational hierarchy than the user, then a reminder will be provided if the process (in this case an email) is not active for 3 minutes. If, the addressee is a co-worker at the same level as the user, then the allowable idle time would be 20 minutes and a reminder would only be sent when the process had been idle for 20 minutes. In an exemplary embodiment, the allowable idle times are adjustable by the user.

Figure 2:
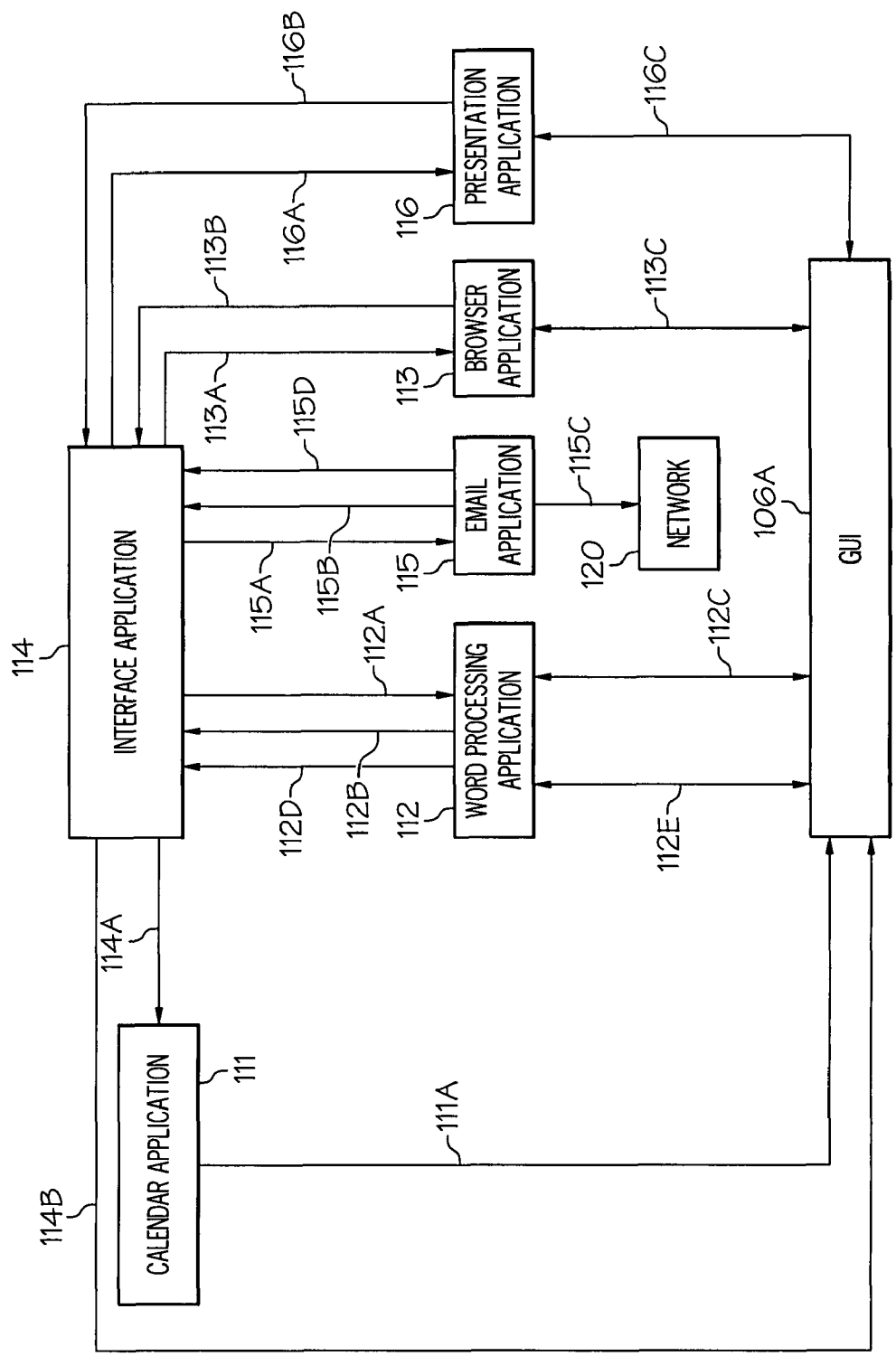
FIG. 2 is a block diagram of an interface application and its interaction with a calendar application and other applications according to an exemplary embodiment of the invention.

Referring now to FIG. 2, interface application 114 interacts or communicates with a calendar application 111, other application 112, 113, 115, 116 and a graphical user interface 106A presented on display 106. In an exemplary embodiment, interface application queries other applications 112, 113, 115, 116 about open processes. In response to these queries 112A, 113A, 115A, 116A, the other applications provide data 112B, 113B, 115B, 116B extracted from active processes opened or launched by the applications.

For example, application 112 is a word processing application which has been used to open two processes (in this case word processing documents) 112C, 112E. Accordingly data extracted from defined fields of these documents 112B, such as date and time the process was opened, title and/or keywords in the process (document), date and time of last update, etc, is transmitted to the interface application 114. This extracted data may then be used by the interface application 114 to create a dynamic task listing 610, 620 (in FIG. 6), which may remain in the interface application 114 or be pushed to the calendar application 111 as an update 114A for the calendar application todo list.

The interface application 114 may also be notified either directly by the other application (e.g., word processing application 112) or by a task manager or the like of the operating system when a process in the application is closed. The notification 112D may initiate an inquiry to the user 114B via a dialog box, for example, indicating that the process has been closed and querying the user whether or not to delete the task listing of the process. If the user chooses to delete the task listing, then the update 114A is sent from the interface application 114 to the calendar application 111, and the calendar application todo list is updated accordingly.

In the example illustrated in FIG. 2, application 115 is an email application, which has been used to open one process 115C (in this case an email). The interface application 114 transmits a query 115A to the email application 115, to extract data from defined fields for each process in the application. For example, the query 115A may extract data from the addressee, date and time opened, status. title/key word, etc fields. The extracted data 115B is transmitted to the interface application 114 to create a dynamic task listing 610, 620 (in FIG. 6), which may remain in the interface application 114 or be pushed to the calendar application 111 as an update 114A for the calendar application todo list.

The interface application 114 may also be notified either directly by the other application (e.g., email application 115) or by a task manager or the like of the operating system when a process in the application is closed (in this case sent through a network 120). The notification 115D may initiate an inquiry to the user 114B via a dialog box, for example, indicating that the process has been closed and querying the user whether or not to delete the task listing of the process. If the user chooses to delete the task listing, then the update 114A is sent from the interface application 114 to the calendar application 111, and the calendar application todo list is updated accordingly. Alternatively, the interface application 114 may automatically update the calendar application 111 to delete the task listing for an email process upon sending the email.

The interface application may also query additional other applications, such as a browser application 113 and a presentation application 116. These queries 113A, 116A provoke extraction of data 113B, 116B from defined data fields in the respective processes, which data is transmitted to the interface application 114 for use in creating task listings. The open processes 112C, 112E, 113C, 115C, 116C may be shown on the display 106 as open files or as tabs depending on whether the process is in the foreground or the background. The task listings may be displayed on the GUI 106A in the foreground as a reference for the user or the task listings may be retrievable by opening the calendar application 111 or bringing the calendar application 111 to the foreground of the GUI.

In addition to creating task listings, the interface application 114 may also either individually or through the calendar application 111 monitor open processes 112C, 112E, 113C, 115C, 116C and provide notification to the user through the GUI 106A when specified conditions exist. For example, the calendar application 111 may compare due date/time for each process as supplied by the interface application against the current date/time available in the calendar application and provide notice 11A to the GUI 16A when the current date/time has exceeded the due date/time if the interface application 114 has not updated the task listing to indicate that the process is completed.

The interface application 114 may query the other applications to extract when the open processes have last been updated (i.e., idle time). This idle time may then be compared with an allowable idle time, such as described with reference to Table 1. The interface application may send a notification 114B to the user through the GUI 106A if the idle time has exceeded the allowable idle time.

Figure 3:
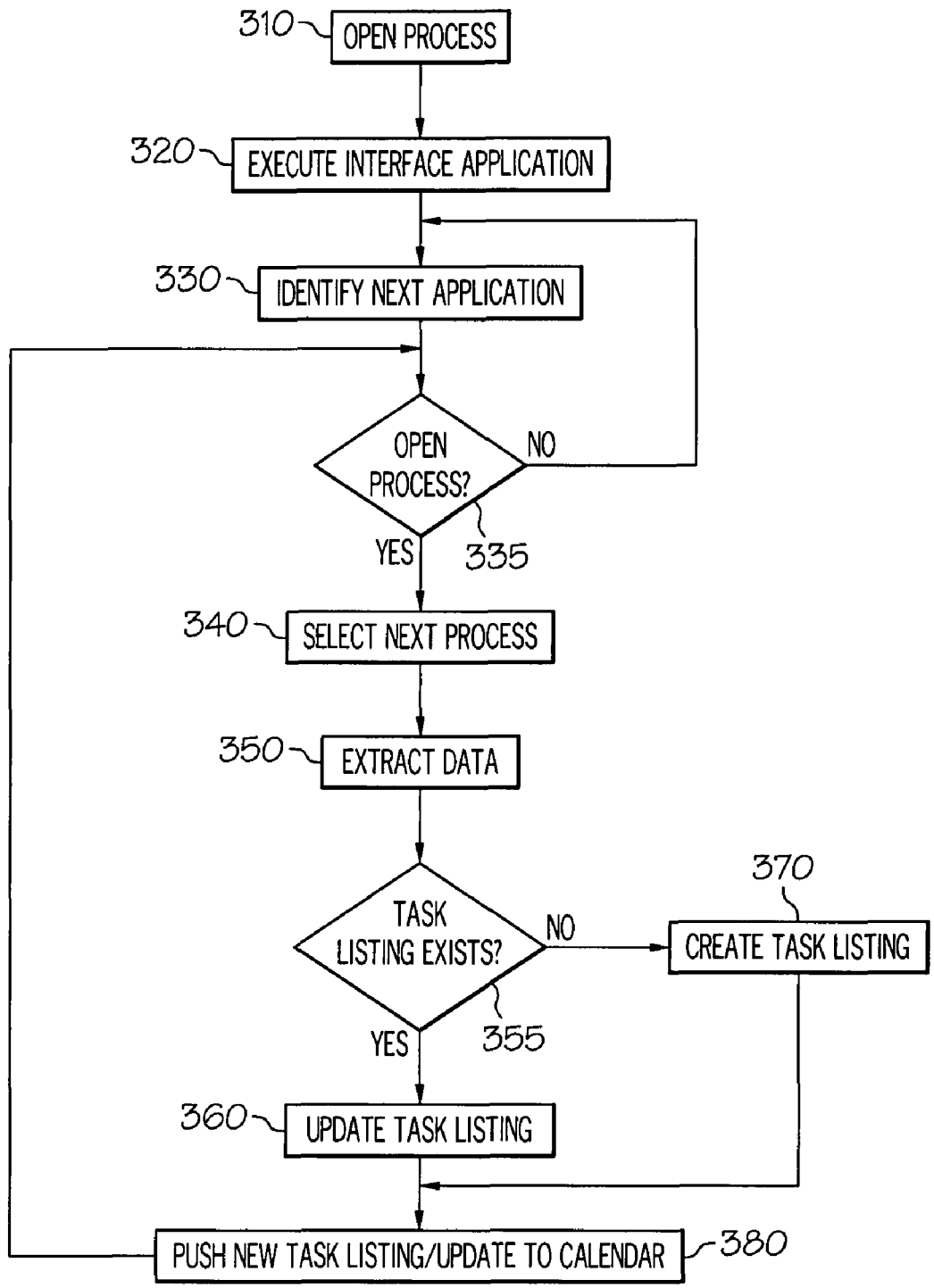
FIG. 3 is a flow diagram of a method for interfacing a calendar application with other applications according to an exemplary embodiment of the invention.

Referring now to FIG. 3, a flow diagram is shown for a process for interfacing between a calendar application and another application to according to an exemplary embodiment of the invention. A process is begun or opened in the other application (step 310). The application may be for example a word processing application such as MS Word, and the process may be for example a document such as a letter describing a software update. The application could alternatively be any of the applications shown in FIG. 2 and described above, or another application which may be used to open and perform processes.

In response to opening the process, the interface application 114 is executed (step 320). Alternatively or additionally, the interface application may periodically execute regardless of whether or not any new application processes are opened. The interface application 114 may be triggered to execute by a task manager or other similar program in the operating system which tracks each process that is open or active. Any change identified by the task manager may prompt execution of the interface application. Alternatively or additionally, the interface application may periodically query each application to identify any open processes. The interface application identifies the next application (step 330). This may be accomplished for example by running through an application table in a defined order. Then, the interface application 114 determines whether or not there are any open processes in the current application (step 335). If there are no open processes, the interface application proceeds to the next application.

If there are open processes in the current application, the interface application 114 selects a next process (step 340) and extracts data from defined fields for the type of process opened (step 350). The processes may for example be selected in the order that they were opened, order of the most recent change, or any other logical sequence. The interface application 114 may extract data by capturing data content in defied fields. For example, for a letter in a word processing application, the interface application might capture the data content in the date field, the addressee field, the Re: field, etc., as well as capturing the time when the process was opened, the time when the process was last changed, the file name, a project designation, and any other data that might be useful for identification and tracking purposes.

The interface application 114 queries itself or the calendar application 111 to determine whether a task listing already exists for the current open process (step 355). If not, the interface application 114 uses the extracted data to create a todo listing for the opened process (step 370). If a task listing already exists, the interface application 114 uses the extracted data to update the task listing (step 360). The new task listings and the task listing updates may be pushed to the calendar application 111 (step 370).

Figure 4:
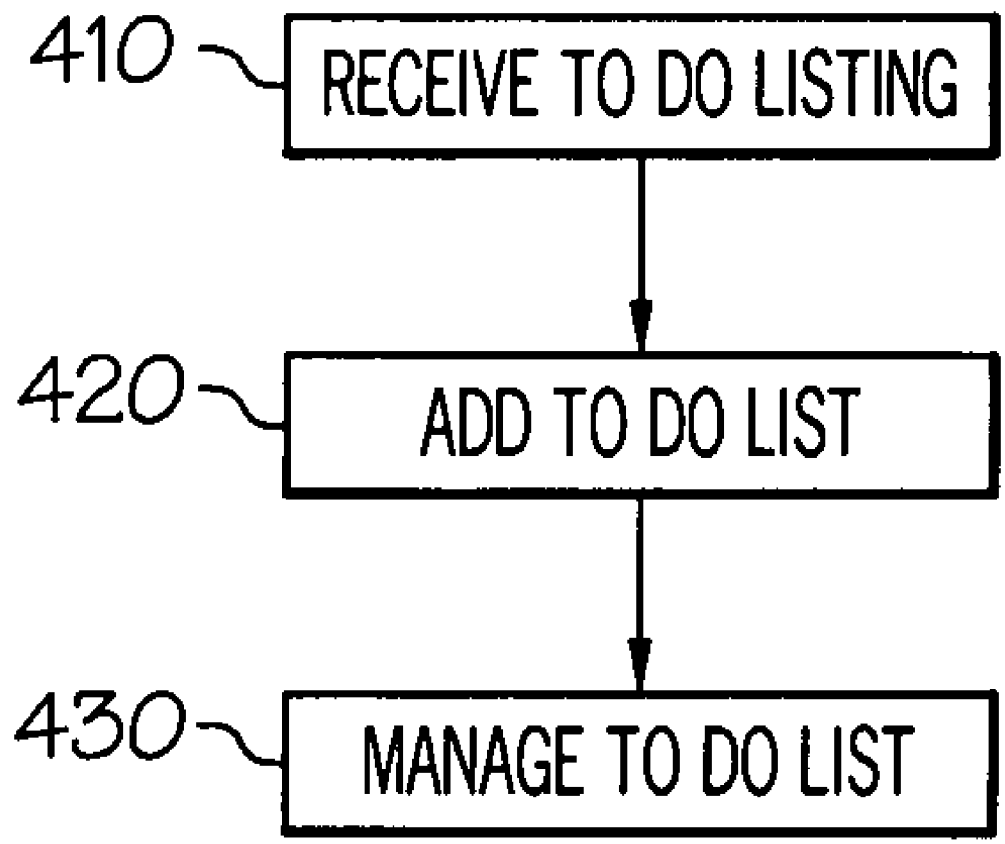
FIG. 4 is a flow diagram of a method for interfacing a calendar application with other applications according to an exemplary embodiment of the invention.
Figure 5:
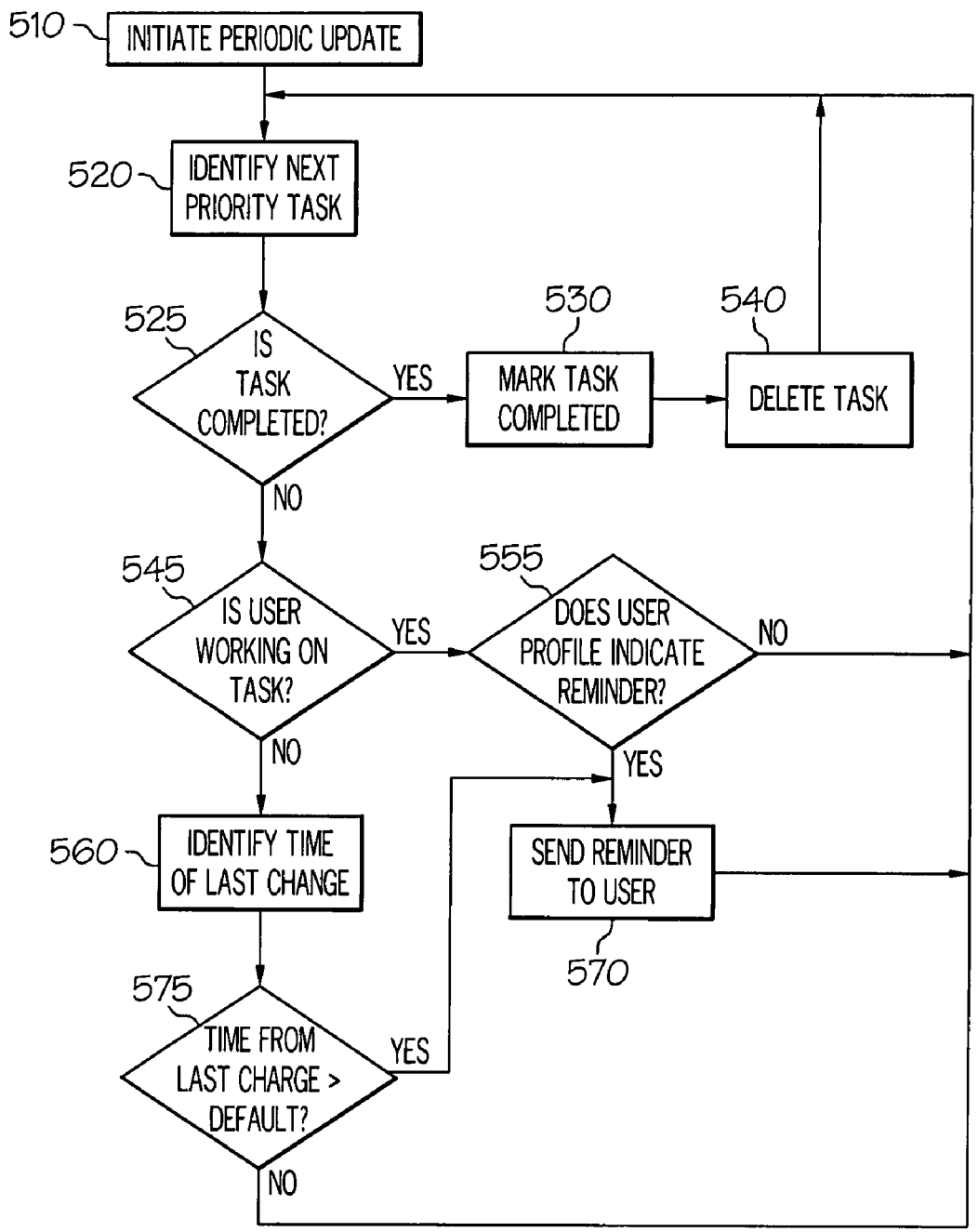
FIG. 5 is a flow diagram of a method for interfacing a calendar application with other applications according to an exemplary embodiment of the invention.

Referring now to FIG. 4, in an exemplary embodiment, the calendar application 111 receives the new task listing or update to task listing (step 410). The new listing or update is added to the todo list in the calendar application (step 420). Then in this exemplary embodiment, the calendar application 111 manages the todo list (step 430). That is, the calendar application 111 notifies the user of past due and/or impending task deadlines Referring to FIG. 5, a flow diagram is shown for a process of managing task listings according to an exemplary embodiment of the invention. The task listings may be managed by the calendar application 111, as described above, by the interface application 114, or by a combination of the two. The task management begins by initiating a periodic update (step 510). The task may alternatively or additionally be triggered by changes identified by a task manager or the like.

In an exemplary embodiment the tasks are updated in priority order (e.g., the task having the earliest due date/time is updated first). Accordingly, the next priority task is identified (step 520). A determination is made of whether or not the task has been completed (step 525). This may be determined by a status obtained during data extraction, for example. The task may be determined to be completed automatically upon occurrence of some operation, such as sending an email. Alternatively, the user may be queried as to whether or not the task is completed when the process is closed.

If the task is completed, then the task may be marked completed in the interface application 114 and/or the calendar application 111 (step 530). Optionally, the task listing may be deleted (step 540) in either or both applications as well. Then, the next priority task is identified (step 520), again.

If the task is not completed, then a determination may be made as to whether or not the user is currently working on the task (step 545). This may be determined, for example, by whether or not the process corresponding to the task is in the foreground in the GUI. If the user is currently working on the task/process, another determination is made, this time of whether or not notification rules indicate that a reminder should be sent (step 555). If not, the next priority task is identified (step 520) and managed. If a reminder is indicated, then a reminder is sent to the user (step 570). This reminder may be in the form of a dialog box, for example, or any other means appropriate for getting the user's attention. The notification rules may be stored in a table or the like in the interface application 114 or in the calendar application 111 and may optionally be capable of being modified by a user or administrator.

If the user is not working on the current task as determined in step 545, then the time from the last change in the process corresponding to the current task is identified or determined. This may be accomplished for example by extracting the time of the last change when data is extracted from the process (see step 350). A determination is made of whether or not the time from the last change is greater than an allowed time in a notification rule table or the like (step 575). If the time from the last change exceeds the allowed time, then a reminder is sent to the user (step 570), and the next priority task is identified (step 520) and managed. If not, the next priority task is identified (step 520) and managed without sending a notification.

Referring now to FIG. 6, a todo list 600 is shown according to an exemplary embodiment of the invention. The todo list comprises task listings 610, 620, 630. Dynamic task listings 610, 620 are those listings created by the interface application 114 by extracting data from open application processes. In the illustrated exemplary embodiment, the individual task listings comprise the rows and various categories of data are provided in the columns. For example, a first task listing 610 is a presentation to be prepared providing a project overview. In the column subject 601, the todo list provides the task identification 611 (Project Overview presentation). In the column due date 602, the date and time that the task is due 612 is provided (Sep. 14, 2007 at 3:00 PM). In the column status 603, the todo list provides the current status 613 (in progress). In the column generation type 604, the todo list provides the identification of how the listing was generated 614 (dynamic). In the column Application type 605, the todo list provides the identity of the application on which the process is created 615 (Microsoft PowerPoint). In the next column 606, the person to be satisfied is provided 66 (here no data has been extracted or inserted). Finally in the last column 607, the category of the task 617 is provided (project).

Similarly, task 620 is listed providing a subject 621 (Customer Issue email to CEO, a due date 622 (Aug. 14, 2007 at 1:30 PM), status 623 (in progress), generation type 624 (dynamic), an application type 625 (lotus notes), an indication of the person to be satisfied 626 (Al Chakra) and the category 637 (customer). Also, task 630 is listed providing a subject 631 (my work over weekend), a due date 632 (Aug. 19, 2007), status 633 (in progress), generation type 634 (manual) and category 637 (homeproject).

Thus, the user has opened a MS PowerPoint process to prepare a presentation titled "Project Overview" for project (the name of the project may optionally be used instead of the word project. The listing was created dynamically (i.e., by the interface application). This presentation is due at 3:00 PM on Sep. 14, 2007. This due date may have been assigned by the interface application 114 using a rule table or may have been entered by the user at the prompting of the interface application 114. The process on/MS PowerPoint is in progress. This is determined by the interface application when it queried the application/process. The user has also opened an email in lotus notes and entered the CEO as the addressee, and customer issue as the subject. This data was extracted dynamically and used to create listing 620. The email is due on Aug. 14, 2007 (the current date of the todo list) at 1:30 PM. Again the due date/time may be determined using a rule table or entered by the user in response to an inquiry or prompt from the interface application 114. The process is currently open and is therefore indicated as in progress. Finally, a weekend task has been manually entered in the calendar application by the user. The status (in progress) has also been manually entered.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain, store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A method of integrating a calendar todo list with information from other applications by an interface application executing on a processor in a dynamic task listing system, the method comprising the steps of:

searching for open application processes in a memory by the interface application, the open application processes corresponding to different types of applications including at least word processing, communication, and presentation applications;

responsive to determining there is at least one open application process, dynamically extracting data for the open application process;

querying a calendar application by the interface application to determine whether a todo task listing already exists for the data extracted from the at least one open application process;

responsive to determining that no todo task listing exists, creating the todo task listings using the extracted data for the open application process;

pushing the todo task listing to the calendar application; and in response to the interface application determining that the at least one open process has been closed, initiating an inquiry to a user indicating that the at least one open process has been closed and querying a user whether or not to delete the todo task listing.

2. The method of claim 1, further comprising the step of managing the calendar todo list.

3. The method of claim 2, further comprising the step of labeling the tasks created with dynamically extracted data.

4. The method of claim 3, wherein managing the todo list comprises periodically updating the todo list based on status of open application processes.

5. The method of claim 4, wherein the extracted data comprises whether or not the task has been completed and the step of updating the todo list comprises cycling through labeled tasks in priority order and changing the status of completed tasks.

6. The method of claim 3, wherein the extracted data comprises a time value and the step of managing the todo list comprises cycling through labeled tasks in priority order and sending a reminder if the time value meets a set value.

7. The method of claim 6, wherein the extracted data further comprises an indication of a person to be satisfied by the task, and the set value is modified in response to the person to be satisfied.

8. The method of claim 3, wherein the extracted data comprises an indication of when the task was last worked on and the step of managing the todo list comprises cycling through labeled tasks in priority order and sending a reminder if the elapsed time from the indicated time exceeds a set value.

9. The method of claim 3, wherein the extracted data comprises an indication of when the task is due and the step of managing the todo list comprises cycling through labeled tasks in priority order and sending a reminder if the due time is within less than a set value.

10. An apparatus for managing tasks in a dynamic task listing system, the apparatus comprising:
a processor adapted to:
search for open application processes in a memory by the interface application, wherein the open application processes correspond to different types of applications including at least word processing, communication, and presentation applications,
responsive to determining there is at least one open application process, dynamically extract data for the open application process,
query a calendar application by the interface application to determine whether a todo task listing already exists for the data extracted from the at least one open application process, and
responsive to determining that no todo task listing exists, create the todo task listings using the extracted data for the open application processes, and in response to the interface application determining that the at least one open process has been closed, initiating an inquiry to a user indicating that the at least one open process has been closed and querying a user whether or not to delete the todo task listing; and
a memory operatively associated with the processor and having stored thereon the todo task listing in the calendar application.

11. The apparatus of claim 10, further comprising a user interface operatively associated with the processor and displaying notification when defined conditions are met for the todo task listing.

12. The apparatus of claim 10, further comprising:
second memory operatively associated with the processor and encoded with a program of instruction for dynamically extracting data for open application processes and creating todo task listings using the data for open application processes; wherein the processor is adapted to execute the program of instruction.

13. A computer program product comprising a non-transitory computer-usable medium having encoded thereon computer executable program code for integrating a calendar todo list with information from other applications in a dynamic task listing system, said computer product having:
computer executable program code for searching for open application processes in a memory by the interface application, the open application processes corresponding to different types of applications including at least word processing, communication, and presentation applications;
computer executable program code for, responsive to determining there is at least one open application process, dynamically extracting data for the open application process;
computer executable program code for querying a calendar application by the interface application to determine whether a todo task listing already exists for the data extracted from the at least one open application process;
computer executable program code for, responsive to determining that no todo task listing exists, creating the todo task listings using the extracted data for the open application process;
computer executable program code for pushing the todo task listing to the calendar application; and
computer executable program code for, in response to the interface application determining that the at least one open process has been closed, initiating an inquiry to a user indicating that the at least one open process has been closed and querying a user whether or not to delete the todo task listing.

14. The computer program product of claim 13, further comprising computer executable program code for managing the calendar todo list.

* * * * *